July 22, 1947.  R. W. ALLEN  2,424,265
RETAINER FOR STUD ASSEMBLY
Filed March 28, 1944
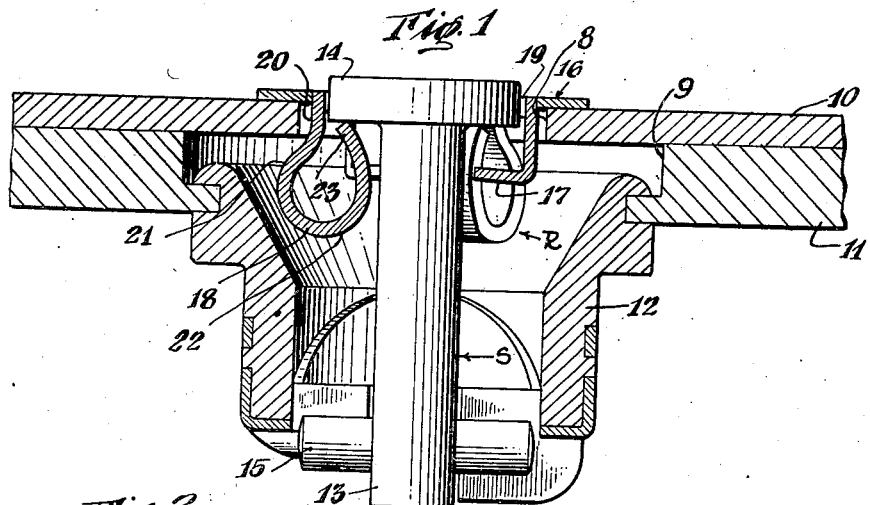
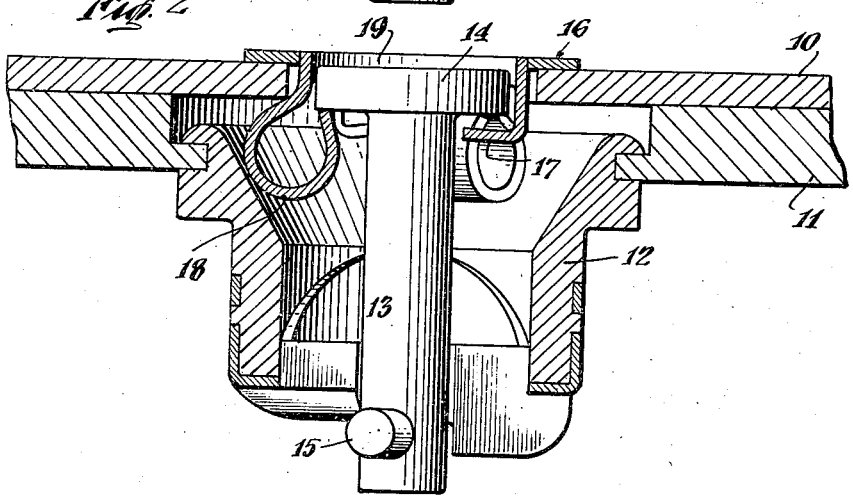
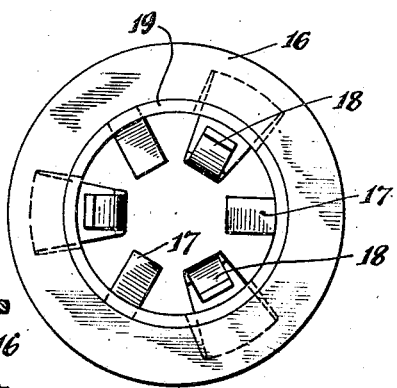
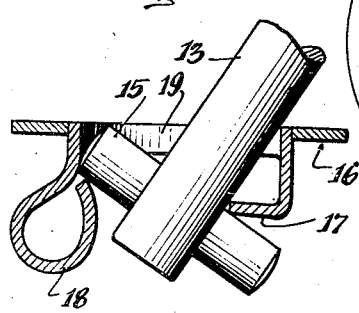
INVENTOR.
Rex W. Allen
BY
Duell, Kane and Smoot
ATTORNEYS Patented July 22, 1947

2,424,265

UNITED STATES PATENT OFFICE 2,424,265

RETAINER FOR STUD ASSEMBLY

Rex W. Allen, Palisades, N. Y., assignor to Camloc Fastener Corporation, New York, N. Y., a corporation of New York Application March 28, 1944, Serial No. 528,417

9 Claims. (Cl. 24—221)

This invention has reference to a fastener of the type which includes a stud and stud receptacle and in its more specific aspects aims to provide a functionally and structurally improved stud retainer or mounting which may be included as part of a stud assembly.

It is an object of the invention to provide a novel structure, by means of which the stud may be detachably associated with a mounting member or sheet. At the same time, the stud will— by means of the improved structure—be normally retained against accidental detachment from the mounting member with which it is associated.

A further object is that of furnishing a structure of this type and by means of which the stud may also be readily detached from the improved retaining member; the association and separation of these elements being capable of achievement without the use of special tools or technique.

An additional object is that of providing a stud assembly which will include fewer parts than have heretofore been regarded as necessary, such reduction in parts being achieved without the sacrifice of any functions which should be inherent in the assembly.

Still another object is that of furnishing a stud-retaining member which preferably takes the place of the spring cup which ordinarily forms a part of the stud assembly.

An additional object is that of furnishing a structure capable of achieving the foregoing objects and which structure will include a simple and rugged design capable of manufacture at a nominal figure and by means of quantity production methods to provide an assembly operating over long periods of time with freedom from all difficulties.

With these and other objects in mind, reference is had to the attached sheet of drawings illustrating one practical embodiment of the invention, and in which:

Fig. 1 is a sectional view of a fastener assembly and illustrating the position of the parts prior to engagement of the stud with the receptacle;

Fig. 2 is a view similar to Fig. 1 but showing the stud and stud receptacle coupled;

Fig. 3 is a top plan view of the retainer or cup member; and

Fig. 4 is a somewhat diagrammatic view showing the retainer in section and with its body in process of association with the stud.

With primary reference to Figs. 1 and 2, it will be seen that the reference numerals 10 and 11 indicate mounting members which, as illustrated, may comprise sheets which are provided with apertures 8 and 9, respectively. Secured to the sheet 11 in any desired manner is a stud receptacle 12. The latter is preferably constructed generally according to the disclosure of United States Patent to Summers 2,239,125 of April 22, 1941.

As such, it presents a bore and has its lower or inner surfaces preferably in the form of cam, detent and stop edge portions, all as disclosed in the patent just referred to. These surfaces are adapted to be engaged by a projection forming a part of a stud S. The latter conveniently includes a shank 13 having a head 14 at one of its ends. The projection is preferably provided adjacent its opposite end in the form of a cross pin element 15. Obviously, as this cross pin rides over the cam surfaces of the receptacle, the shank 13 is moved axially to retract the head 14. This movement continues until the cross pin engages the detent portions of the receptacle and is prevented from further movement by means of the stops. When the stud is rotated in a reverse direction, the parts finally assume positions at which the pin 15 or corresponding projecting portions align with slots in the receptacle and whereupon the stud may be withdrawn from the same.

Now with a view to providing a structure designed in accordance with the teachings of the present invention and by means of which the stud may be mounted or supported with reference to the sheet 10 or its equivalent, a retaining member R is employed. This member, as illustrated, may taken the form of a cup including an outwardly extending part or flange 16, and projections 17 and curved spring elements or tongues 18, both of which extend downwardly from flange 16. Flange 16 should be formed of metal and be of sufficient area and rigidity that it provides a proper support for the stud assembly. The projections 17 and spring elements 18 may be formed from a single piece of material such as spring steel. They may be connected to each other and to part 16 by a common body portion 19. This body portion should preferably have a diameter less than the diameter of the aperture which is to receive the cup. Thus, under normal conditions, the retainer may shift laterally within the aperture. As a consequence, a floating or centering structure is provided. Brazing may be employed in order to connect the part 16 with the body 19 in the event it is not feasible to form the several parts of a single piece of material.

The projections 17 as shown terminate in inwardly extending portions. These underlie the head 14 of the stud and act in cooperation with such head as stops to limit axial projection of the stud.

The curved tongues or spring elements 18 adjacent their points of connection with the body 19 extend downwardly as indicated by the reference numeral 20. Beyond such downwardly extending portions they extend outwardly as indicated at 21. These outwardly and downwardly extending portions are continued in the form of curved bodies extending inwardly and thence inwardly and upwardly as indicated at 22. The free ends of the tongues 18 preferably extend outwardly and upwardly as indicated at 23 and terminate adjacent the lower edges of the body portion 19. Thus, these tongues include relatively flexible and resilient hook or substantially loop-shaped portions. Projections 17, being shorter than spring elements 18, are relatively more rigid than are the spring elements. Also, in view of the greater length of the latter the bending moment may occur over a larger lineal area. In the arrangement shown, the spring elements and the projections are alternately arranged for a reason which will be pointed out hereinafter.

As will be apparent, body 19, projections 17 and spring elements 18 define in aggregate what was earlier referred to as a cup which is provided with a bore for the passage of stud S. The diameter of this bore is greater than the diameter of the stud but is less than that of the head 14 or the length of the cross pin element 15. Accordingly, with the retaining member encircling the stud as illustrated in Figs. 1 and 2, displacement of the stud downwardly will be prevented by engagement of the underside of its head with the spring elements 18. Removal of the stud in an opposite direction will be prevented by the cross pin element engaging the spring elements and/or the projections.

When it is desired to remove the retainer R from the mounting member 10, this may readily be accomplished by, for example, constricting the retainer by moving the spring elements inwardly to points at which they may pass through the aperture 8. This may be achieved by a suitable constricting tool. A further method of achieving the desired result is that of exerting a pull upon the cup or retainer R and away from the mounting member 10. This will cause the outer surfaces of the spring elements 18 to engage against the edge of the aperture 8 in the mounting member. They will cam against this edge under continued movement of the retainer R and thus be constricted so that the unit may be withdrawn from the aperture. Obviously, a mounting of the retainer on the plate 10 or its equivalent may be effected by simply thrusting the spring elements and body of the retainer inwardly through the aperture. This will again cause the spring elements 18 to be moved towards the axis of the retainer and thus permit the spring elements to extend beyond the inner face of the mounting member 10. When they extend in this manner, they will be free to snap outwardly and thus cause the retainer to be clipped or latched into engagement with the mounting member.

An accidental detachment of the retainer from the mounting member is prevented in that if an upward pull is exerted on the stud this will merely have the effect of causing the cross pin to engage one or more of the spring elements 18. Such engagement will result in the element or elements moving upwardly to a position beyond that shown in Figs. 1 and 2. Accordingly, the latching or clipping action will be emphasized. Again, if no stud is applied to the retainer and the mounting member is disposed on, for example, a supporting surface with the elements 18 bearing against that surface, it is obvious even if the plate 10 is stepped upon, the retainers will not be projected through the apertures. Rather, the mounting surface will cause the elements 18 to shift outwardly or away from the retainer axis in response to increasing pressures.

Association of the stud with the retainer may be effected either with the retainer supported by the mounting member or free of the same. The cross pin may have an effective length greater than that of the aperture of the mounting member. In any event, it is greater than the diameter of the bore defined by the projections 17 and elements 18. Consequently, to apply the stud, the end of the shank and cross pin should be inserted into the bore in, for example, the manner shown in Fig. 4. Under these circumstances, the shank is tilted. If, now, the shank is rocked so that its axis extends parallel to the axis of the retainer, the outer end of the cross pin will simply bear against one or more spring elements of the retainer and cam past the same. Thereupon, the shank will be encircled by the retainer. A separation of these elements may be effected by reversing the foregoing operation.

As will be apparent, the spring elements 18 yieldingly support the stud and resist movements of the same in the direction of the cross pin. Accordingly, if the parts are in the position shown in Fig. 1 and a rotation of the stud is effected, the springs provided by the elements will be compressed as the cross pin traverses the cam surfaces of the receptacle 12. The compression will continue until the cross pin lies within the detent portions of the receptacle. The spring action of the elements 18 against the head 14 will serve to retain the projection or cross pin in position and thus prevent accidental movements of the same with respect to the receptacle. Also, these springs will yieldingly resist sheet separation. If separation beyond a predetermined point does occur then the head 14 will engage the relatively rigid projections or stop members 17 which will prevent further separation. In the arrangement shown in Fig. 3, there are three spring elements 18 and three projections 17 arranged alternately. Thus, a spring element is disposed opposite a projection and the spring elements which support the head 14 of the stud are symmetrically arranged. Also, the arrangement facilitates insertion and removal of the stud, as shown in Fig. 4.

Thus, among others, the several objects of the invention as specifically aforenoted are achieved. Obviously, numerous changes in construction and rearrangements of the parts might be resorted to without departing from the spirit of the invention as defined by the claims.

I claim:

1. A retainer for supporting a headed stud of a fastener assembly within the aperture of a mounting member, said retainer comprising an annular body, an annular flange carried adjacent the upper edge of the body and arranged to overlie the upper marginal edges of the mounting member adjacent the aperture, and spaced spring elements extending downwardly from the body, the outer ends of such spring elements being curved upwardly, and a projection extending inwardly from such body between at least two of such spring elements, the spring elements being arranged to yieldingly engage the lower surface of the head of the stud.

2. A retainer for supporting a headed stud of a fastener assembly within the aperture of a mounting member, said retainer comprising an annular body, an annular flange carried adjacent the upper edge of the body and arranged to overlie the upper marginal edges of the mounting member adjacent the aperture, and spaced, curved spring elements extending downwardly from the body, the spring elements being arranged to yieldingly engage the lower surface of the head of the stud.

3. A retainer for supporting a headed stud of a fastener assembly within the aperture of a mounting member, said retainer comprising an annular body, an annular flange carried adjacent the upper edge of the body and arranged to overlie the upper marginal edges of the mounting member adjacent the aperture, and spaced spring elements extending downwardly from the body, the outer terminals of such spring elements being curved upwardly and arranged to yieldingly engage the lower surface of the head of the stud when the fastener assembly is in locked position.

4. A retainer for supporting a headed stud of a fastener assembly within the aperture of a mounting member, said retainer comprising an annular body which receives the stud, and spaced, curved spring elements extending downwardly from the body, the spring elements being arranged to yieldingly engage the lower surface of the head of the stud when the fastener assembly is in locked relation.

5. A retainer for supporting a headed stud of a fastener assembly within the aperture of a mounting member, the stud being provided at its lower end with a cross-pin element, such retainer comprising a generally cylindrical body, spaced spring elements and projections extending downwardly from the body, the spring elements being substantially circular and extending radially outwardly beyond the periphery of the aperture and inwardly to yieldingly support the lower surface of the stud head, the projections extending radially inwardly.

6. A retainer for supporting a headed stud of a fastener assembly within the aperture of a mounting member, the stud being provided at its lower end with a cross-pin element, such retainer comprising a generally cylindrical body, an annular flange at the upper end of the body which may engage the upper surface of the mounting member adjacent the aperture, and spaced spring elements and projections extending downwardly from the body, the outer terminals of the spring elements being curved upwardly to yieldingly support the lower surface of the stud head, the projections extending radially inwardly, the spring elements and projections being arranged to permit insertion and removal of the stud from the retainer.

7. A retainer for supporting a headed stud of a fastener assembly within the aperture of a mounting member, the stud being provided at its lower end with a cross-pin element, such retainer comprising a generally cylindrical body, an annular flange at the upper end of the body, and spaced, alternate spring elements and projections extending downwardly from the body, the outer terminals of the spring elements being curved upwardly and arranged to yieldingly support the lower surface of the stud head when the fastener assembly is in locked relation, the projections extending radially inwardly, the spring elements and projections being so arranged as to permit insertion and removal of the stud with its cross-pin element from the cup.

8. A retainer for supporting a headed stud of a fastener assembly within the aperture of a mounting member, the stud being provided at its lower end with a cross-pin element, such retainer comprising a generally cylindrical body of lesser diameter than the diameter of the aperture, an annular flange at the upper end of the body which may engage the upper surface of the mounting member adjacent the aperture, and spaced spring elements and projections extending downwardly from the body, the spring elements being substantially circular and extending radially outwardly beyond the periphery of the aperture and inwardly to yieldingly support the lower surface of the stud head, the projections extending radially inwardly, the body, spring elements and projections forming, in effect, a cup for the stud which permits insertion and removal of the stud from the cup.

9. A retainer for supporting a headed stud of a fastener assembly within the aperture of a mounting member, said retainer comprising an annular body of lesser diameter than the diameter of the aperture, an annular flange carried adjacent the upper edge of the body and arranged to overlie the upper marginal edges of the mounting member adjacent the aperture, and spaced, curved spring elements extending downwardly from the body, such spring elements being substantially circular in side elevation and provided with portions extending radially inwardly and outwardly of the body, the spring elements being arranged to yieldingly engage the lower surface of the head of the stud.

REX W. ALLEN.

REFERENCES CITED

The following references are of record in the file of this patent:

UNITED STATES PATENTS

| Number | Name | Date |
| --- | --- | --- |
| 2,239,125 | Summers | Apr. 22, 1941 |
| 2,252,286 | Hathorn | Aug. 12, 1941 |

FOREIGN PATENTS

| Number | Country | Date |
| --- | --- | --- |
| 521,276 | Great Britain | May 16, 1940 |